(12) United States Patent
Wang

(10) Patent No.: US 11,865,604 B2
(45) Date of Patent: Jan. 9, 2024

(54) ASSEMBLY MODULE

(71) Applicant: Ting-Jui Wang, New Taipei (TW)

(72) Inventor: Ting-Jui Wang, New Taipei (TW)

( * ) Notice: Subject to any disclaimer, the term of this patent is extended or adjusted under 35 U.S.C. 154(b) by 0 days.

(21) Appl. No.: 17/951,126

(22) Filed: Sep. 23, 2022

(65) Prior Publication Data

US 2023/0019131 A1 Jan. 19, 2023

Related U.S. Application Data

(62) Division of application No. 17/124,522, filed on Dec. 17, 2020.

(51) Int. Cl.
*B21D 39/03* (2006.01)
*B23P 19/04* (2006.01)

(52) U.S. Cl.
CPC ............ *B21D 39/031* (2013.01); *B23P 19/04* (2013.01)

(58) Field of Classification Search
CPC ........ F16B 19/04; F16B 19/06; F16B 19/086; F16B 19/10
See application file for complete search history.

(56) References Cited

U.S. PATENT DOCUMENTS 644,672 A * 3/1900 Johnson ................... B21J 15/10
29/243.53

FOREIGN PATENT DOCUMENTS

KR 2016106129 A * 9/2016 ............. B21D 39/03

OTHER PUBLICATIONS

English translation CN 207586982 (Year: 2018).*

* cited by examiner

*Primary Examiner* — Jason L Vaughan
*Assistant Examiner* — Amanda Kreiling

(57) ABSTRACT

An assembly module, an assembly apparatus, and a method of operating the assembly module are introduced. The assembly module includes a first assembly die, a second assembly die and at least one engagement die. The first assembly die has a plurality of first fitting portions. The second assembly die has a plurality of second fitting portions and corresponds in position to the first assembly die. The engagement die is removably disposed at a related point of at least one first fitting portion, at a related point of at least one second fitting portion or at related points of at least one first fitting portion and at least one second fitting portion. Therefore, the assembly module is effective in fitting a component and an assembly target together, easy to operate, and conducive to quick assembly.

2 Claims, 16 Drawing Sheets

ASSEMBLY MODULE

CROSS-REFERENCE TO RELATED APPLICATION

This application is a divisional patent application of U.S. application Ser. No. 17/124,522 filed on Dec. 17, 2020, the entire contents of which are hereby incorporated by reference for which priority is claimed under 35 U.S.C. § 121.

BACKGROUND OF THE INVENTION

1. Field of the Invention

The present disclosure relates to provides assembly modules, assembly apparatuses and assembly module operating methods, and in particular to an assembly module, an assembly apparatus, and a method of operating the assembly module, adapted to fit a component and an assembly target together, easy to operate, and conducive to quick assembly.

2. Description of the Related Art

Conventional assembly modules require multiple assembly apparatuses and processes according to parts and components to be put together to the detriment of ease of operation and assembly speed.

Therefore, it is important to provide an assembly module, an assembly apparatus, and a method of operating the assembly module, adapted to fit a component and an assembly target together, easy to operate, and conducive to quick assembly.

BRIEF SUMMARY OF THE INVENTION

An objective of the present disclosure is to provide an assembly module, an assembly apparatus, and a method of operating the assembly module, adapted to fit a component and an assembly target together, easy to operate, and conducive to quick assembly.

To achieve at least the above objective, the present disclosure provides an assembly module, comprising a first assembly die, a second assembly die and at least one engagement die. The first assembly die has a plurality of first fitting portions. The second assembly die has a plurality of second fitting portions and corresponds in position to the first assembly die. The engagement die is removably disposed at a related point of at least one first fitting portion, at a related point of at least one said second fitting portion or at related points of at least one first fitting portion and at least one said second fitting portion.

The present disclosure further provides an assembly module, comprising: a first assembly die and at least one engagement die, or a second assembly die and at least one engagement die. The first assembly die has a plurality of first fitting portions. Alternatively, the second assembly die has a plurality of second fitting portions. The engagement die is removably disposed at at least one first fitting portion or at at least one said second fitting portion.

In the assembly module, the engagement die switches from the first fitting portions to the second fitting portions and vice versa according to at least one component or at least one assembly target to be fitted in place.

In the assembly module, the first fitting portions and the second fitting portions are arranged in matrix or located at positions defined by encoding and code arrangement.

In the assembly module, each said engagement die of the at least one said first fitting portion and the at least one said second fitting portion has an assembly target, the assembly target having an assembled portion for fitting to a component, the component having a filler space, wherein each said engagement die presses against the component, and material of the assembled portion enters or flows into the filler space.

In the assembly module, each said engagement die of the at least one said first fitting portion and the at least one said second fitting portion has an assembly target, the assembly target having an assembled portion for fitting to a component, the component having an expanded connection portion, wherein each said engagement die presses against the expanded connection portion of the component, and the expanded connection portion is expandedly connected to the assembled portion.

In the assembly module, the engagement dies each have one or more joining portions disposed at one or more first fitting portions or second fitting portions to meet the need for the room or position required to fit at least one component or at least one assembly target in place or fit at least one component to at least one assembly target.

In the assembly module, the first fitting portions or the second fitting portions are holes, slots, bumps, dents, steps, slopes, arcuate surfaces, curved surfaces, planes, clasps or threads.

In the assembly module, the engagement die has joining portions fitted to the first fitting portions or the second fitting portions, and the joining portions are holes, slots, bumps, dents, steps, slopes, arcuate surfaces, curved surfaces, planes, clasps or threads.

In the assembly module, at least one component, at least one assembly target, and the at least one component fitted to the at least one assembly target have different editing modes whose execution requires mounting different engagement dies on the first fitting portions and the second fitting portions, respectively.

In the assembly module, the first fitting portions, the second fitting portions and the engagement dies are fitted together by locking, engagement, riveting, magnetic attraction or welding or are integrally formed.

In the assembly module, the first engagement die is fitted to the first target assembly position, and the second engagement die is fitted to the second target assembly position.

In the assembly module, the engagement dies each have one or more joining portions which are engaged with the first fitting portions and the second fitting portions by locking, engagement, riveting, magnetic attraction, or welding or are integrally formed therewith.

In the assembly module, the first fitting portions or the second fitting portions are arranged in matrix, and the first fitting portions are spaced apart from the second fitting portions by identical distances or different distances, respectively.

In the assembly module, the first fitting portions and the second fitting portions are managed by code, or the engagement die is managed by code.

In the assembly module, the first fitting portions and the second fitting portions are managed by code, or the engagement die has one or more joining portions managed by code, or the engagement die is managed by code.

In the assembly module, different engagement or arrangement engagement between the first fitting portions and the second fitting portions or the engagement dies can bring different fitting-applicable heights, rooms, positions and/or force distribution engagement.

In the assembly module, the first assembly die, the second assembly die, the first fitting portions, the second fitting portions, the engagement dies or joining portions of the engagement dies are manufactured by milling machines, lathes, CNC processing, die injection, forging or die processing.

In the assembly module, the first assembly die, the second assembly die, the first fitting portions, the second fitting portions, the engagement die and/or a joining portion of the engagement die are threads, columns, cones, dents, bumps, planes, slopes, steps, curved surfaces or arcuate surfaces.

In the assembly module, under invariable or variable conditions, the first fitting portions of the first assembly dies and the second fitting portions of the second assembly die operate in conjunction with at least one engagement die which is selected or designed according to at least one different or identical component, at least one different or identical assembly target or at least one different or identical component fitted to at least one different or identical assembly target.

In the assembly module, the first assembly die, the second assembly die, the first fitting portions, the second fitting portions, wherein the engagement dies or joining portions of the engagement dies are automated fitting devices, compressing devices and/or screwing devices.

In the assembly module, the engagement die fits at least one component in place, and the component is a clasp, wherein the component has a head or body capable of movable connection, and the head has a clasp.

In the assembly module, the clasp is a column, thread, outward clasp or inward clasp.

The assembly module further comprises a resilient component which has one end abutting against the head and the other end abutting against the body.

In the assembly module, the component has a filler space, an expanded connection portion, a thread or a compressed portion. The component is a unitary unit or comprises constituent elements fitted together.

In the assembly module, the component has a neck portion, or the component has a cone portion or thread, or the neck portion is engaged with another object.

In the assembly module, the component device is mounted on a carrier and fetched with a tool before being compared by a comparison device to determine its position or distance relative to at least one assembly target. After that, the component device is placed at an assembled portion of the assembly target.

In the assembly module, the tool is a vacuum sucker, clamp, clasp or magnetic sucker.

In the assembly module, the first fitting portions, the second fitting portions and the engagement dies are grouped to attain different positions, heights and/or patterns, so as to enhance the compatibility of the engagement dies with the at least one component and at least one assembly target or the compatibility of the at least one component assembly with the at least one assembly target.

In the assembly module, the first assembly die and the second assembly die are integrally formed with the first fitting portions and the second fitting portions, or the first assembly die and the second assembly die are integrally formed with the engagement dies, or the first assembly die and the second assembly die are integrally formed with the first fitting portions, the second fitting portions and the engagement dies.

In the assembly module, the first assembly die and the second assembly die are mounted on the same assembly apparatus, or an assembly apparatus only has the first assembly die, or an assembly apparatus only has the second assembly die.

In the assembly module, the first assembly die or the second assembly die is disposed at one or more assembly apparatuses, wherein the assembly apparatus or the assembly apparatus connected to a computer network can control or automate the first assembly die or the second assembly die.

The present disclosure further provides an assembly apparatus which the first assembly die and the second assembly die are disposed in. The assembly apparatus or the first assembly die and the second assembly die each have a fixing portion for fixation and connection.

In the assembly apparatus, the assembly apparatus or the first assembly die and the second assembly die each have a fixing portion for fixation and connection.

In the assembly apparatus, the assembly apparatus has a frame portion functioning as a frame, wherein the frame portion has a wheel movement portion for effecting wheel movement.

In the assembly apparatus, the assembly apparatus performs compression and driving by pneumatic driving, hydraulic driving, manual compression and driving, electrical driving, screwing force-driven driving, magnetic driving or external force-driven driving.

In the assembly apparatus, the assembly apparatus has downward-pressing portions for downward-pressing against at least one component or at least one assembly target, or the at least one component is fitted to the at least one assembly target.

In the assembly apparatus, the downward-pressing portions each have an upper portion and a lower portion, wherein the upper portion is pressed downward to enter the lower portion, or the lower portion is pressed downward to enter the upper portion.

In the assembly apparatus, the assembly apparatus comprises automated fitting devices, compressing devices and/or screwing devices for use in assembly.

In the assembly apparatus, the assembly apparatus has an operating panel.

In the assembly apparatus, the assembly apparatus has a comparison device for carrying out comparison to determine the position or distance of the first assembly die or the second assembly die, so as to accurately place the component or the assembly target at a target position of the second assembly die or the first assembly die or confirm that the component or the assembly target has been correctly positioned.

In the assembly apparatus, the assembly apparatus has a heater for heating up a component with a weldable surface and an assembly target with a weldable surface or heating up solder between a component and an assembly target in order to weld the component and the assembly target together.

In the assembly apparatus, the first fitting portions, the second fitting portions and engagement dies are grouped to attain different positions, heights and/or patterns, so as to enhance the compatibility of the engagement dies and the assembly apparatus with the at least one component and the at least one assembly target, or the compatibility of the at least one component with the at least one assembly target.

The present disclosure further provides a method of operating an assembly module, which involves mounting the assembly module on the first fitting portions or the second fitting portions, then placing at least one component, at least one assembly target or at least one component fitted to at least one assembly target on the assembly module, and compressing the at least one component and at least one assembly target or compressing the at least one component against at least one assembly target, with the assembly module.

The present disclosure further provides a method of an assembly module, which involves mounting the assembly module on the first fitting portions or the second fitting portions, then placing at least one component, at least one assembly target or at least one component fitted to at least one assembly target on the assembly module, and pressing the assembly module against at least one component, at least one assembly target or at least one component fitted to at least one assembly target, so as to effect assembly. The first fitting portions or the second fitting portions are managed by code. Alternatively, the assembly module has one or more joining portions managed by code. Alternatively, the engagement die is managed by code.

The present disclosure further provides a method of operating an assembly module, which involves mounting the assembly module on the first fitting portions or the second fitting portions, then placing at least one component, at least one assembly target or at least one component fitted to at least one assembly target on the assembly module, and pressing the assembly module against at least one component, at least one assembly target or at least one component fitted to at least one assembly target, so as to effect assembly. Different engagement or arrangement engagement between the first fitting portions and the second fitting portions or the engagement dies can bring different fitting-applicable heights, rooms, positions and/or force distribution engagement.

The present disclosure further provides a method of operating an assembly module, comprising an assembly apparatus which the first assembly die or the second assembly die is disposed in. The method involves mounting the engagement die on the first fitting portions or the second fitting portions, then placing at least one component, at least one assembly target or at least one component fitted to at least one assembly target at the engagement die, and pressing the engagement die against at least one component, at least one assembly target or at least one component fitted to at least one assembly target, so as to effect assembly. The first fitting portions or the second fitting portions are managed by code. The assembly module has one or more joining portions managed by code. Alternatively, the engagement die is managed by code.

The present disclosure further provides a method of operating an assembly module, comprising an assembly apparatus which the first assembly die or the second assembly die is disposed in. The method involves mounting the engagement die on the first fitting portions or the second fitting portions, then placing at least one component, at least one assembly target or at least one component fitted to at least one assembly target at the engagement die, and pressing the engagement die against at least one component, at least one assembly target or at least one component fitted to at least one assembly target, so as to effect assembly. Different engagement or arrangement engagement between the first fitting portions and the second fitting portions or the engagement dies can bring different fitting-applicable heights, rooms, positions and/or force distribution engagement.

Therefore, an assembly module, an assembly apparatus, and a method of operating the assembly module according to the present disclosure are adapted to fit a component and an assembly target together, easy to operate, and conducive to quick assembly.

DETAILED DESCRIPTION OF THE INVENTION

Figure 1:
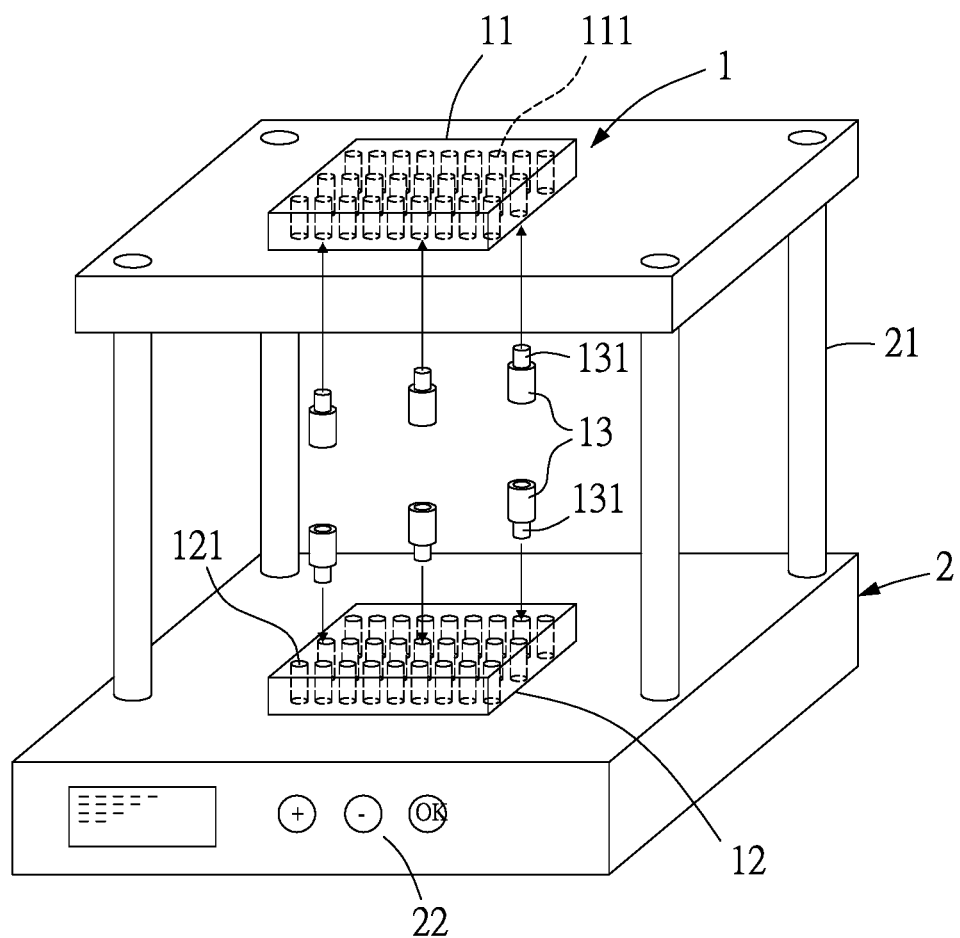
FIG. 1 is a perspective view of the first embodiment of the present disclosure.
Figure 2:
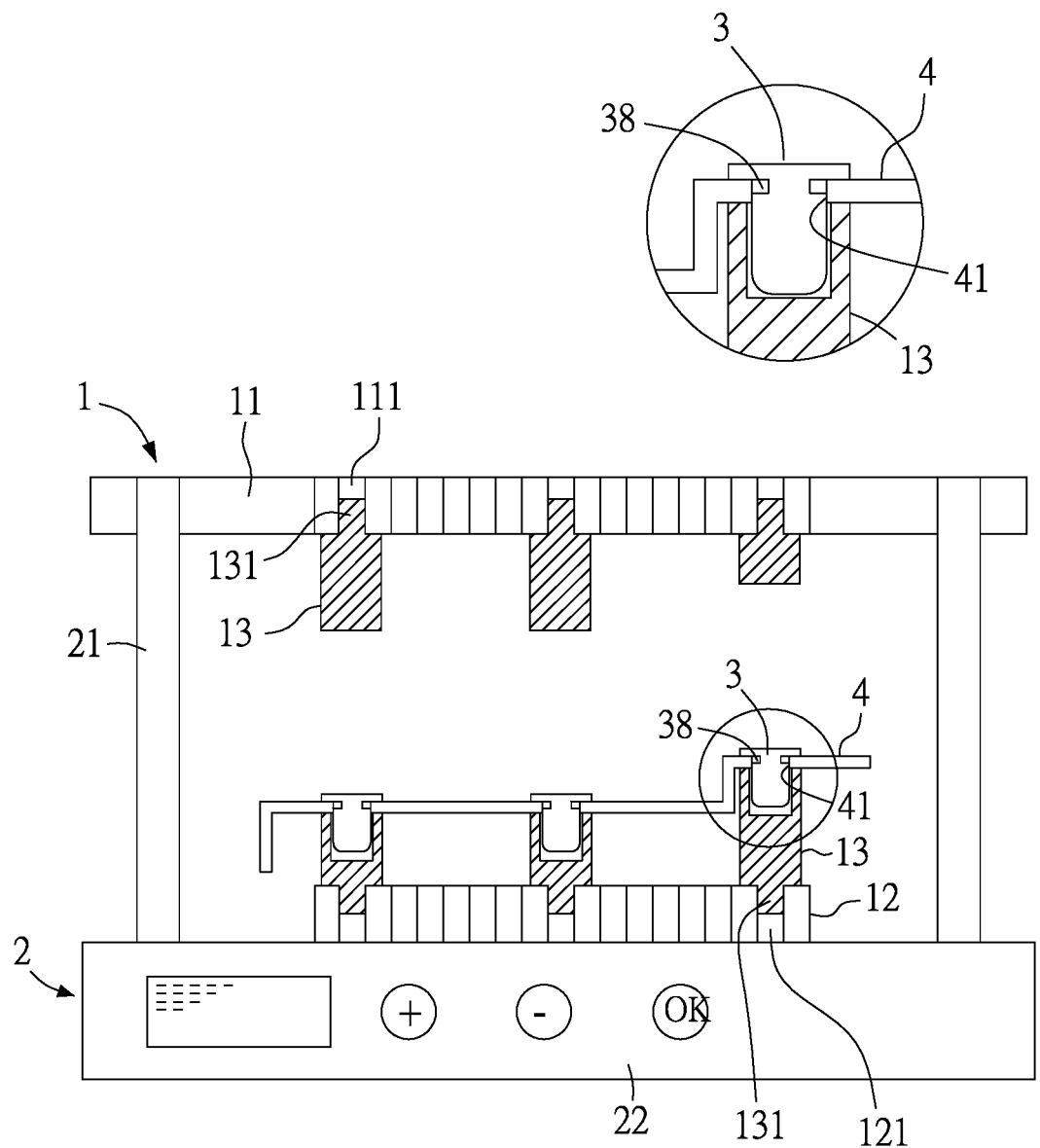
FIG. 2 is schematic view 1 of operation of the first embodiment of the present disclosure.
Figure 3:
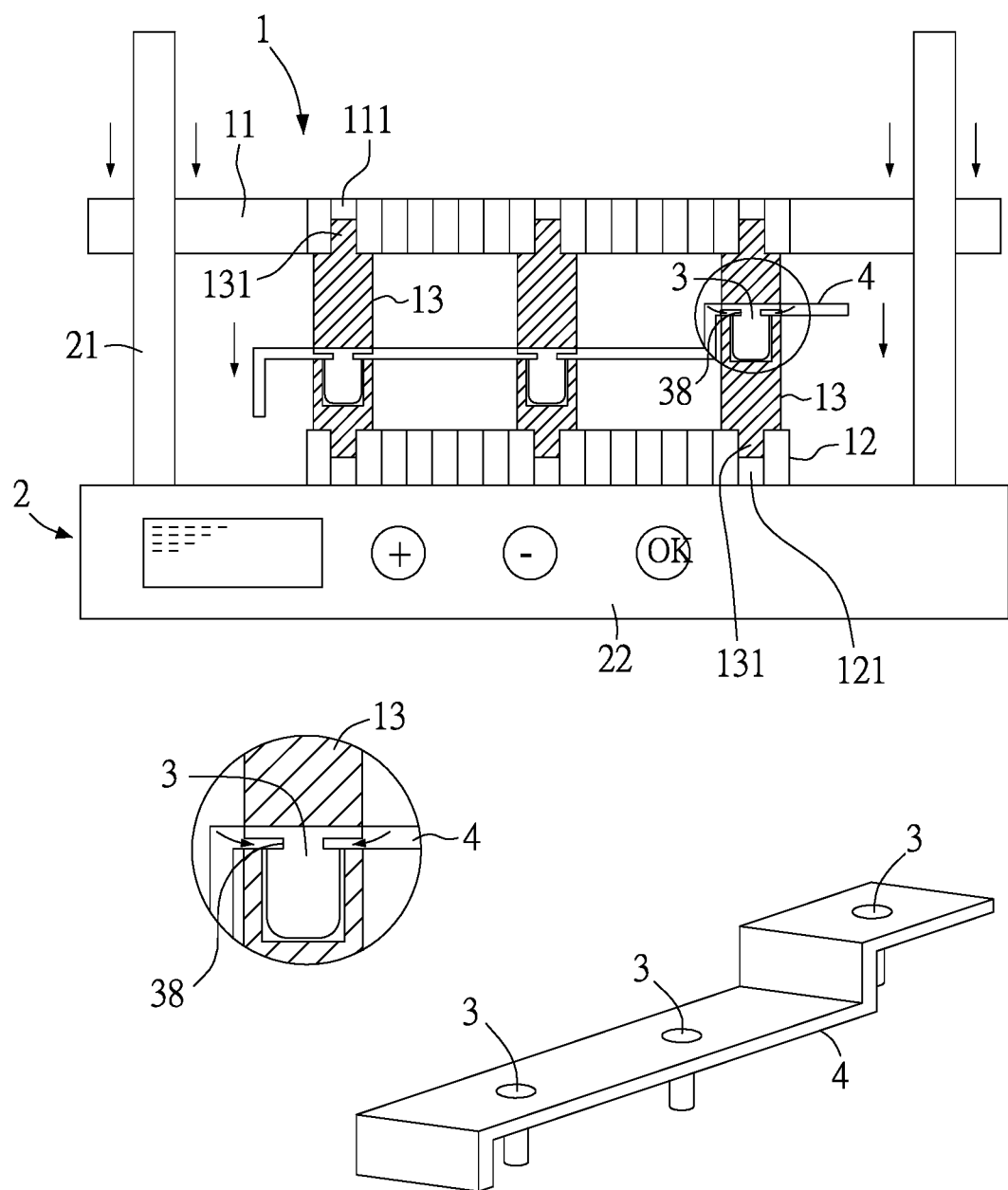
FIG. 3 is schematic view 2 of operation of the first embodiment of the present disclosure.

To facilitate understanding of the object, characteristics and effects of this present disclosure, embodiments together with the attached drawings for the detailed description of the present disclosure are provided.

Referring to FIG. 1 through FIG. 4, the present disclosure provides an assembly module, an assembly apparatus, and a method of operating the assembly module. As shown in the diagrams, an assembly module 1 comprises a first assembly die 11, a second assembly die 12 and at least one engagement die 13.

The first assembly die 11 has a plurality of first fitting portions 111.

The second assembly die 12 has a plurality of second fitting portions 121 and corresponds in position to the first assembly die 11.

The engagement die 13 is removably disposed at a related point of at least one first fitting portion 111. Alternatively, the engagement die 13 is removably disposed at a related point of at least one second fitting portion 121. Alternatively, the engagement die 13 is removably disposed at related points of at least one first fitting portion 111 and at least one said second fitting portion 121.

The assembly module 1 comprises the first assembly die 11 and the engagement die 13 or comprises the second assembly die 12 and the engagement die 13. The engagement die 13 is removably disposed at at least one first fitting portion 111 or at at least one second fitting portion 121.

In an embodiment of the present disclosure, the assembly process further requires a plurality of engagement dies 13. Both the first assembly die 11 and the second assembly die 12 are disposed at an assembly apparatus 2. The assembly apparatus 2 has at least one downward-pressing portion 21. The engagement dies 13 are changed relative to the first fitting portions 111 and the second fitting portions 121, such that the engagement dies 13 meet the assembly need related to at least one component 3 or at least one assembly target 4, which is/are to be fitted in place. After that, the downward-pressing portion 21 of the assembly apparatus 2 presses downward against the at least one component 3 (or assembly target 4), such that the at least one component 3 is fitted to the at least one assembly target 4. Therefore, the assembly module is easy to operate and conducive to quick assembly.

In a preferred embodiment of the present disclosure, the first fitting portions 111 and the second fitting portions 121 are provided with the engagement dies 13, respectively, so as to fit at least one assembly target 4 in place. The assembly target 4 has an assembled portion 41 for engagement with the at least one component 3. The at least one component 3 has a filler space 38. The engagement dies 13 press against the at least one component 3, such that the material of the assembly target 4 enters or flows into the filler space 38, allowing the at least one component 3 to be firmly coupled to the assembly target 4.

In a preferred embodiment of the present disclosure, the first assembly die 11 are the second assembly die 12 mounted on the assembly apparatus 2. In a variant embodiment of the present disclosure, only the first assembly die 11 is mounted on the assembly apparatus 2. In a variant embodiment of the present disclosure, only the second assembly die 12 is mounted on the assembly apparatus 2. Therefore, the present disclosure meets the need for practical use.

In a preferred embodiment of the present disclosure, the first assembly die 11 or the second assembly die 12 is disposed in an assembly apparatus 2 or at least one assembly apparatus 2. The assembly apparatus 2 or the at least one assembly apparatus 2 is connected to a computer network to control or automate the first assembly die 11 or the second assembly die 12. Therefore, the present disclosure meets the need for practical use.

Figure 4:
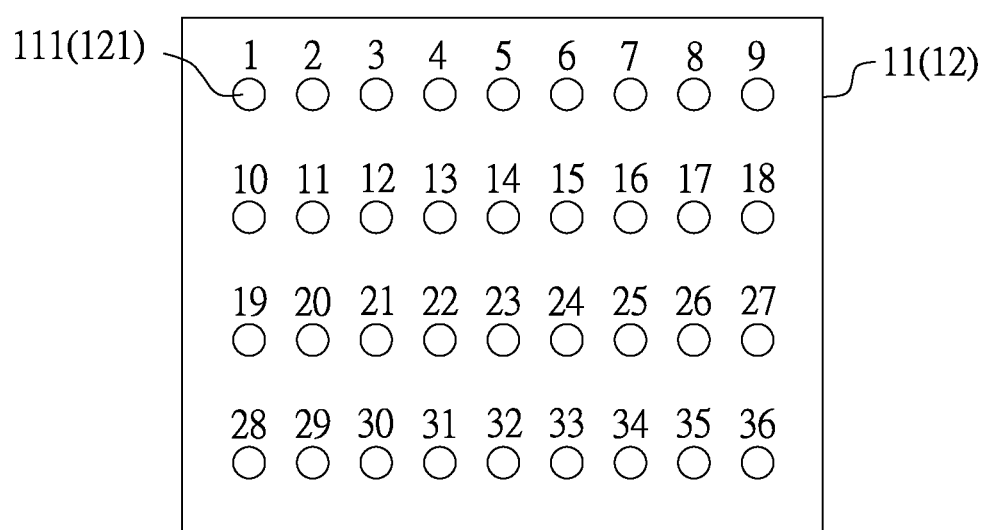
FIG. 4 is a schematic view of a first assembly die and a second assembly die of the present disclosure.

Referring to FIG. 4, in a preferred embodiment of the present disclosure, the first fitting portions 111 and the second fitting portions 121 are arranged in matrix or located at positions defined by encoding and code arrangement. The positions of the first fitting portions 111 and the second fitting portions 121 are labeled by encoding. Then, the engagement dies 13 corresponding to the code are selected according to the assembly position of the at least one assembly target 4 or the assembly position of the at least one component 3 to fit the at least one assembly target 4 or the at least one component 3 in place. The first fitting portions 111 and the second fitting portions 121 are arranged in matrix. Each first fitting portion 111 is spaced apart from the corresponding second fitting portion 121 by equal distance or unequal distance. Therefore, the present disclosure meets the need for practical use.

In a preferred embodiment of the present disclosure, the first fitting portions 111 and the second fitting portions 121 are holes, slots, bumps, dents, steps, slopes, arcuate surfaces, curved surfaces, planes, clasp and/or threads. Therefore, the present disclosure meets the need for practical use.

In a preferred embodiment of the present disclosure, the engagement dies 13 each have joining portions 131 to be fitted to the first fitting portions 111 and the second fitting portions 121. The joining portions 131 are holes, slots, bumps, dents, steps, slopes, arcuate surfaces, curved surfaces, planes, clasp or threads. The joining portions 131, the first fitting portions 111 and the second fitting portions 121 are fitted together by locking, engagement, riveting or magnetic attraction. Therefore, the present disclosure meets the need for practical use.

In a preferred embodiment of the present disclosure, the assembly apparatus 2 performs compression and driving by pneumatic driving, hydraulic driving, manual compression and driving, electrical driving, screwing force-driven driving, magnetic driving or external force-driven driving. Therefore, the present disclosure meets the need for practical use.

In a preferred embodiment of the present disclosure, the assembly apparatus 2 comprises automated fitting devices, compressing devices and/or screwing devices for use in assembly. Therefore, the present disclosure meets the need for practical use.

In a preferred embodiment of the present disclosure, the assembly apparatus 2 has an operating panel 22. Therefore, the present disclosure meets the need for practical use.

In a preferred embodiment of the present disclosure, the first fitting portions 111, the second fitting portions 121 and the engagement dies 13 are fitted together by locking, engagement, riveting or magnetic attraction.

In a preferred embodiment of the present disclosure, the engagement dies 13 each have one or more joining portions 131. The joining portions 131 are disposed at one or more first fitting portions 111 and the second fitting portions 121, respectively, in accordance with the room or position of at least one component 3 or at least one assembly target 4 or in order for at least one component 3 to be fitted to at least one assembly target 4. Therefore, the present disclosure meets the need for practical use.

In a preferred embodiment of the present disclosure, different engagement or arrangement engagement between the first fitting portions 111 and the second fitting portions 121 or the engagement dies 13 can bring different fitting-applicable heights, rooms, positions and/or force distribution engagement. Therefore, the present disclosure meets the need for practical use.

In a preferred embodiment of the present disclosure, the first assembly die 11, the second assembly die 12, the first fitting portions 111, the second fitting portions 121, the engagement dies 13 or the joining portions 131 are manufactured by milling machines, lathes, CNC processing, die injection, forging or die processing. Therefore, the present disclosure meets the need for practical use.

In a preferred embodiment of the present disclosure, the first assembly die 11, the second assembly die 12, the first fitting portions 111, the second fitting portions 121, the engagement dies 13 and/or the joining portions 131 are threads, columns, cones, dents, bumps, planes, slopes, steps, curved surfaces and/or arcuate surfaces. Therefore, the present disclosure meets the need for practical use.

In a preferred embodiment of the present disclosure, the first fitting portions 111, the second fitting portions 121 and the engagement dies 13 are arranged at different positions, heights and/or patterns to enhance the compatibility of the engagement dies 13 and the assembly apparatus 2 with the at least one component 3 and at least one assembly target 4, or the compatibility of the at least one component 3 with the at least one assembly target 4. Therefore, the present disclosure meets the need for practical use.

In a preferred embodiment of the present disclosure, the first assembly die 11, the second assembly die 12, the first fitting portions 111, the second fitting portions 121, the engagement dies 13 and/or the joining portions 131 of the engagement dies 13 are automated fitting devices, compressing devices and/or screwing devices for use in an assembly process. Therefore, the present disclosure meets the need for practical use.

Figure 5:
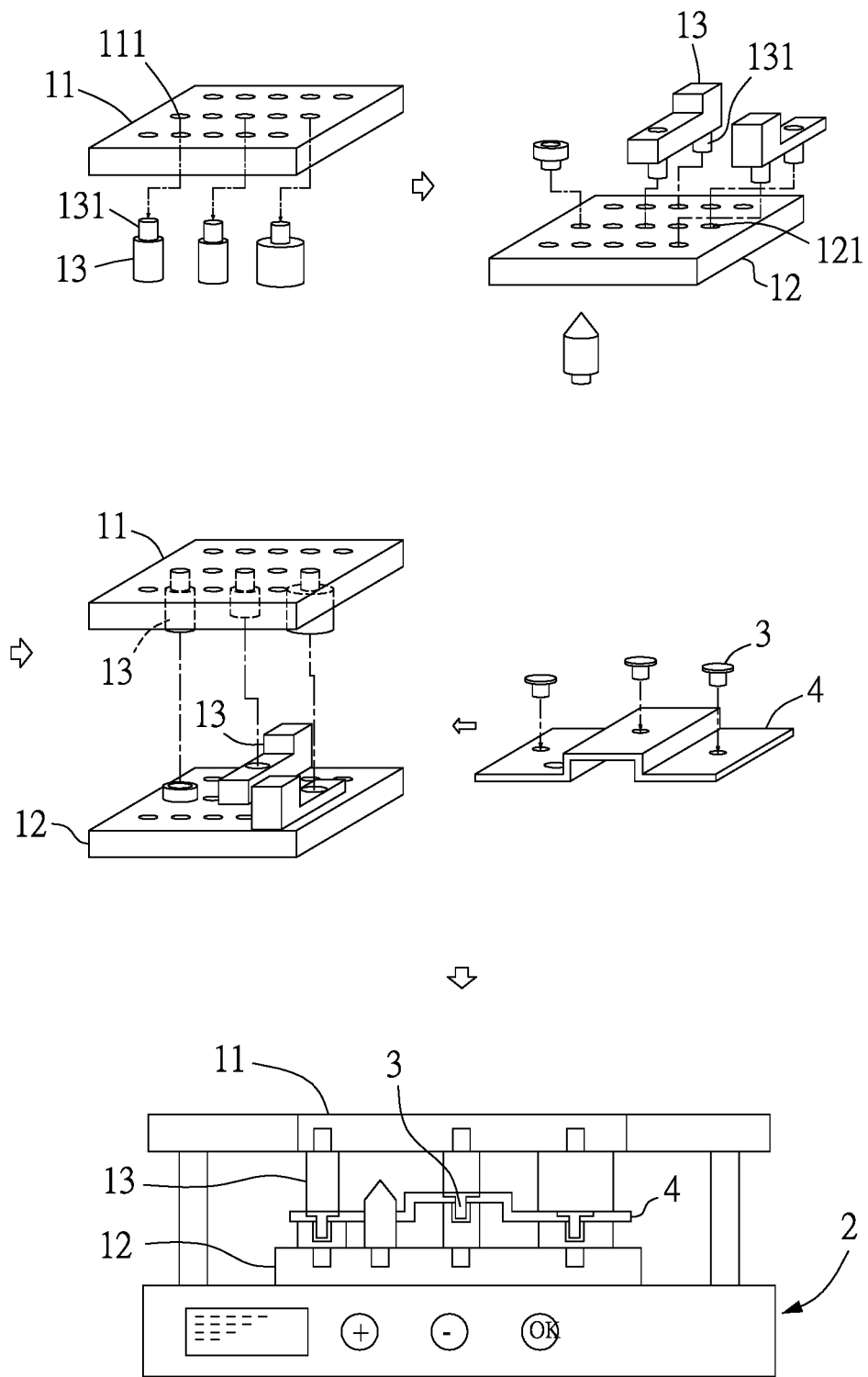
FIG. 5 is a schematic view of operation of the second embodiment of the present disclosure.

Referring to FIG. 5, in a preferred embodiment of the present disclosure, at least one component 3, at least one assembly target 4, and the at least one component 3 fitted to the at least one assembly target 4 have different editing modes whose execution requires mounting different engagement dies 13 on the first fitting portions 111 and the second fitting portions 121, respectively. The first fitting portions 111 and the second fitting portions 121 are managed by code. The engagement dies 13 and the joining portions 131 are managed by code. Therefore, the present disclosure meets the need for practical use.

Figure 6:
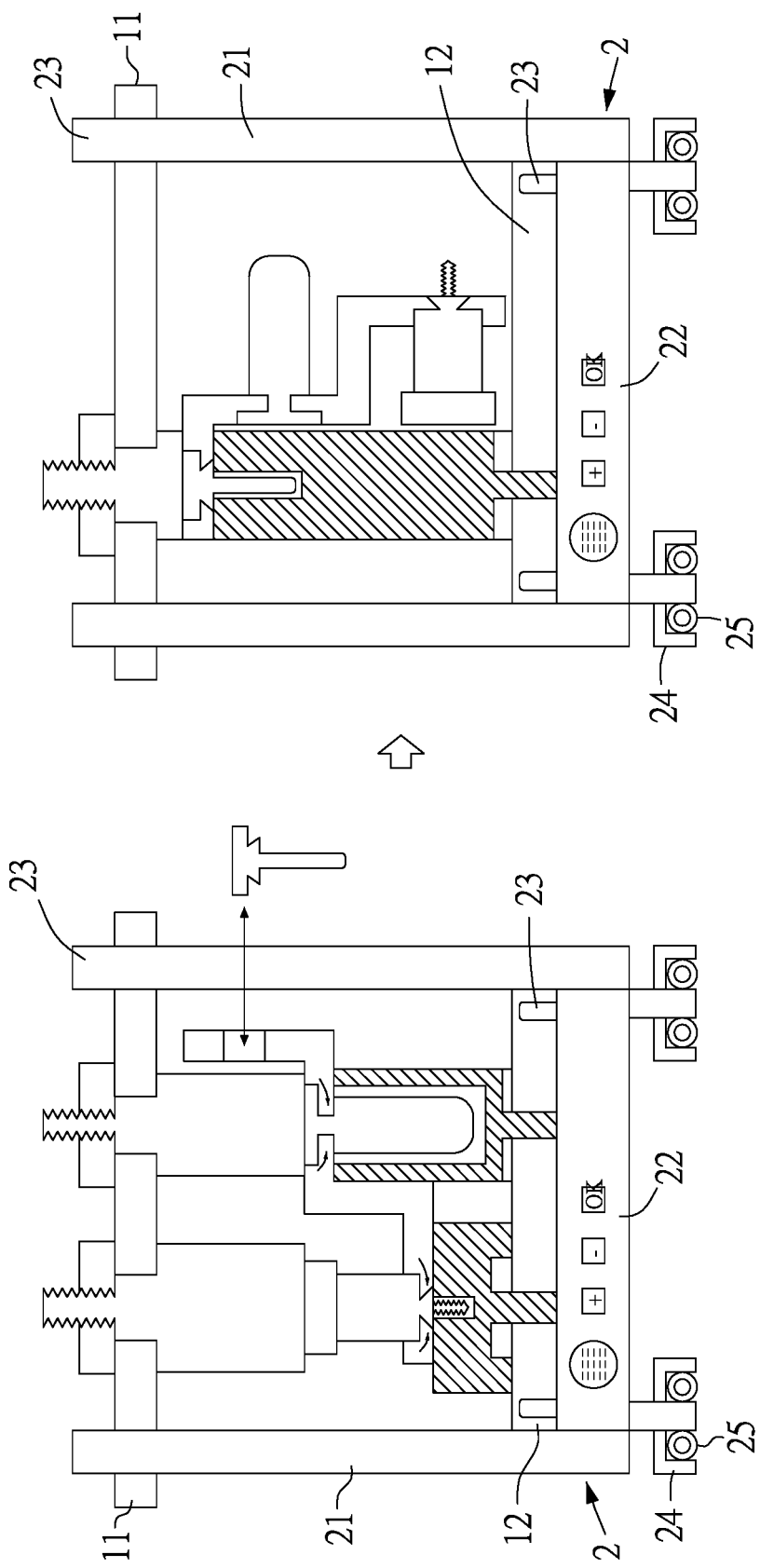
FIG. 6 is a schematic view of operation of the third embodiment of the present disclosure.

Referring to FIG. 6, in a preferred embodiment of the present disclosure, the assembly apparatus 2 has a fixing portion 23 for fixing the second assembly die 12 in place and a frame portion 24 for functioning as a frame. The frame portion 24 has a wheel movement portion 25 for effecting wheel movement. Therefore, the present disclosure meets the need for practical use.

Figure 7:
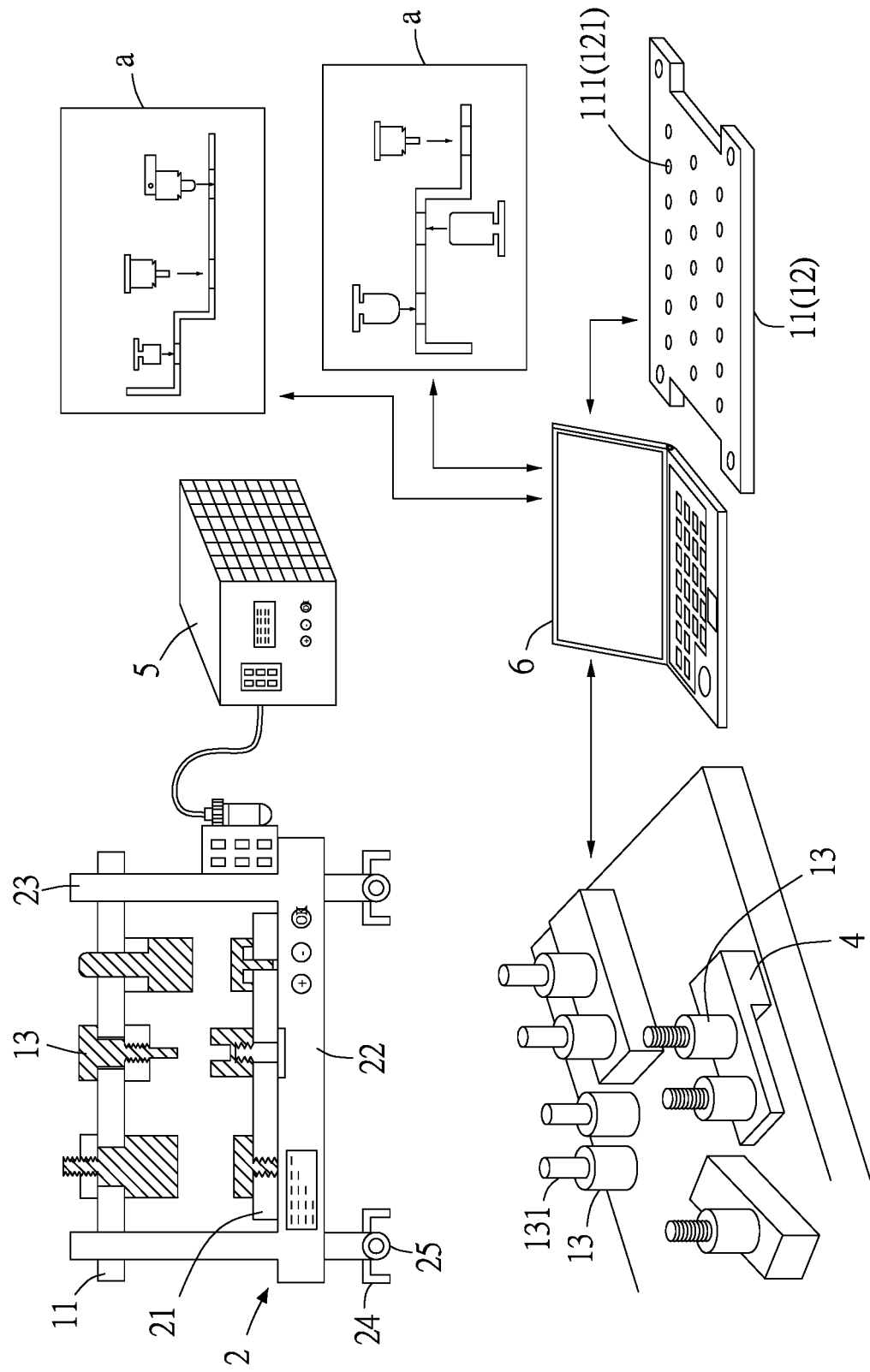
FIG. 7 is a schematic view of operation of the fourth embodiment of the present disclosure.

Referring to FIG. 7, in a preferred embodiment of the present disclosure, the first fitting portions 111 and the second fitting portions 121 are managed by code, whereas the engagement dies 13 and the joining portions 131 are managed by code. Furthermore, the first assembly die 11, the second assembly die 12, the first fitting portions 111, the second fitting portions 121, the engagement dies 13 and/or the joining portions 131 have different project editing modes whose execution requires mounting different engagement dies 13 on the first fitting portions 111 and the second fitting portions 121 to effect assembly of different projects. The assembly process entails fitting the first engagement die 13 at the first target assembly position and fitting the second engagement die 13 at the second target assembly position to the at least one component 3, the at least one assembly target 4, or the at least one component 3 at the at least one assembly target 4. Furthermore, the first fitting portions 111, the second fitting portions 121 and the engagement dies 13 are grouped to attain different positions, heights and/or patterns, so as to enhance the compatibility of the engagement dies 13 and the assembly apparatus 2 with the at least one component 3 and the at least one assembly target 4, or the compatibility of the at least one component 3 with the at least one assembly target 4. Therefore, the present disclosure meets the need for practical use.

In a preferred embodiment of the present disclosure, a compression and driving device 5 of the assembly apparatus 2 is a pneumatic driving or hydraulic driving.

Figure 8:
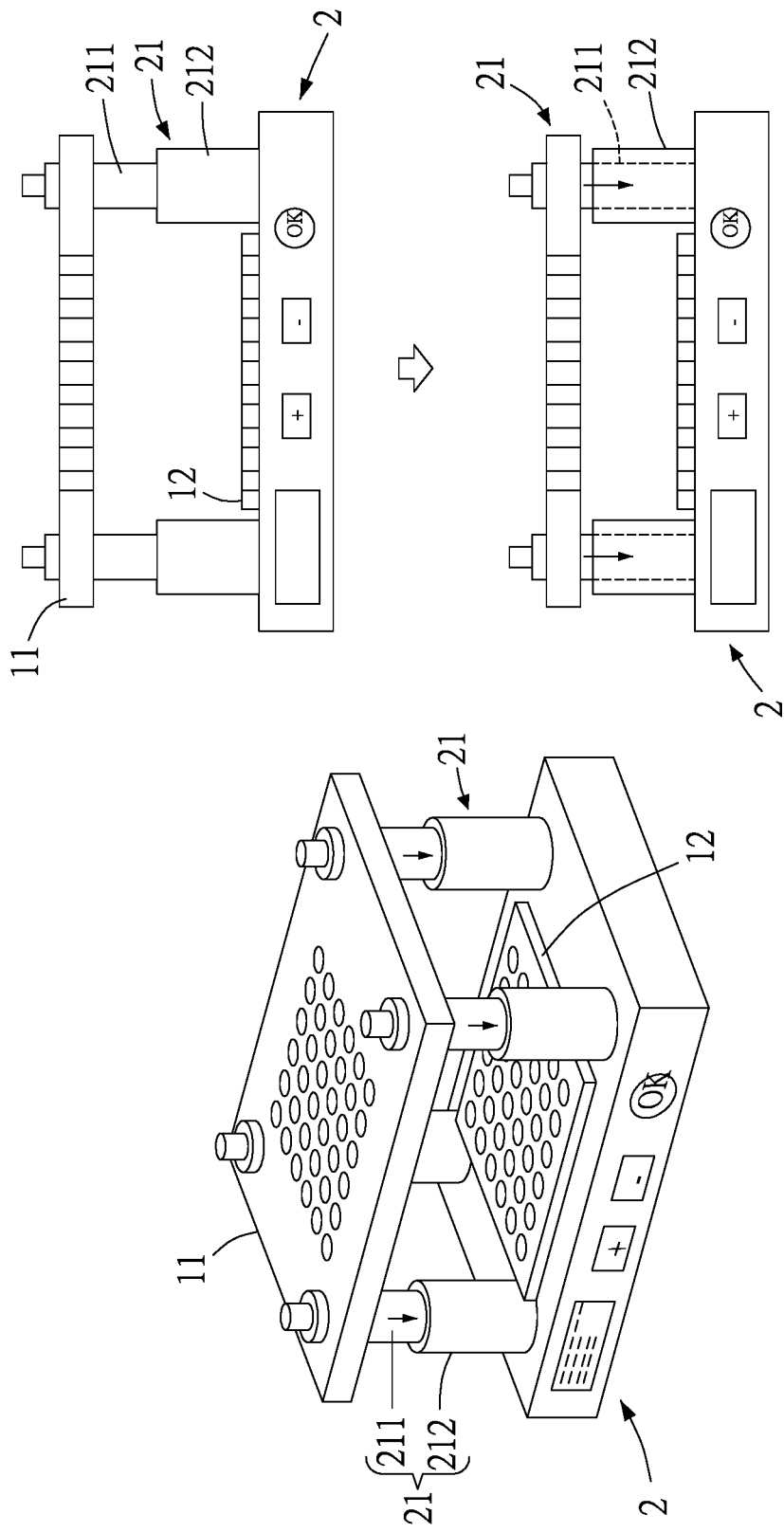
FIG. 8 is a schematic view of operation of the fifth embodiment of the present disclosure.

Referring to FIG. 8, in a preferred embodiment of the present disclosure, the assembly apparatus 2 has a plurality of downward-pressing portions 21 for downward-pressing against at least one component 3 or at least one assembly target 4 or fitting at least one component 3 to at least one assembly target 4. The downward-pressing portions 21 each have an upper portion 211 and a lower portion 212. Under a downward-pressing force, the upper portion (for example, rod) 211 enters the lower portion (for example, cup) 212, or the lower portion (for example, cup) 212 enters the upper portion (for example, rod) 211. Therefore, the present disclosure meets the need for practical use.

Figure 9:
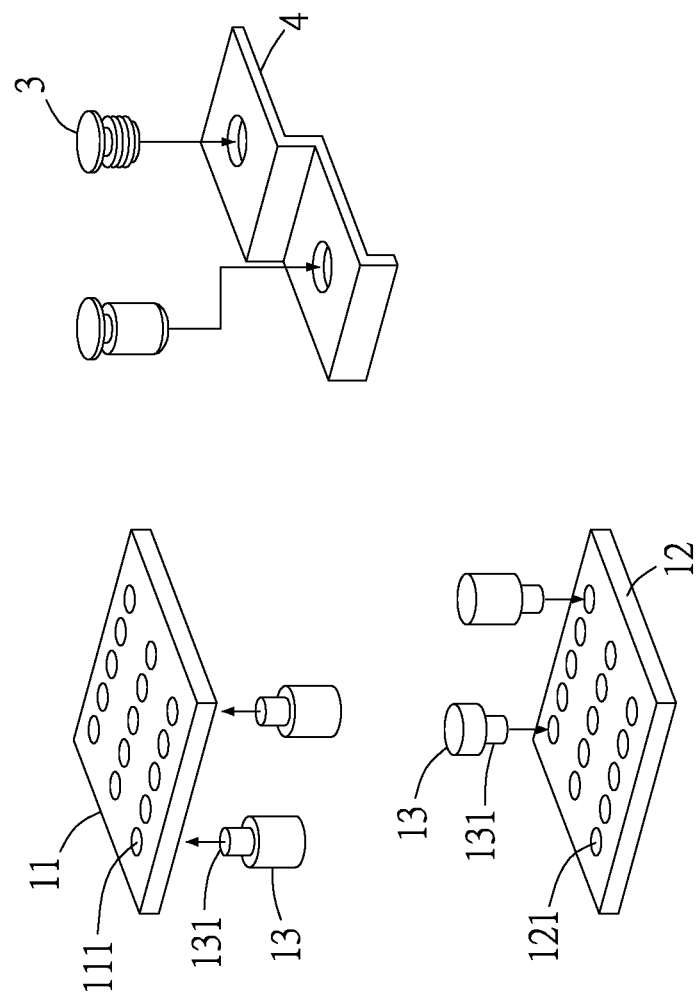
FIG. 9 is a schematic view of operation of the sixth embodiment of the present disclosure.

Referring to FIG. 9, in a preferred embodiment of the present disclosure, under invariable or variable conditions, the first fitting portions 111 of the first assembly dies 11 and the second fitting portions 121 of the second assembly die 12 operate in conjunction with at least one engagement die 13 which is selected or designed according to at least one different or identical component 3, at least one different or identical assembly target 4 or at least one different or identical component 3 fitted to at least one different or identical assembly target 4. Therefore, the present disclosure meets the need for practical use.

Figure 10:
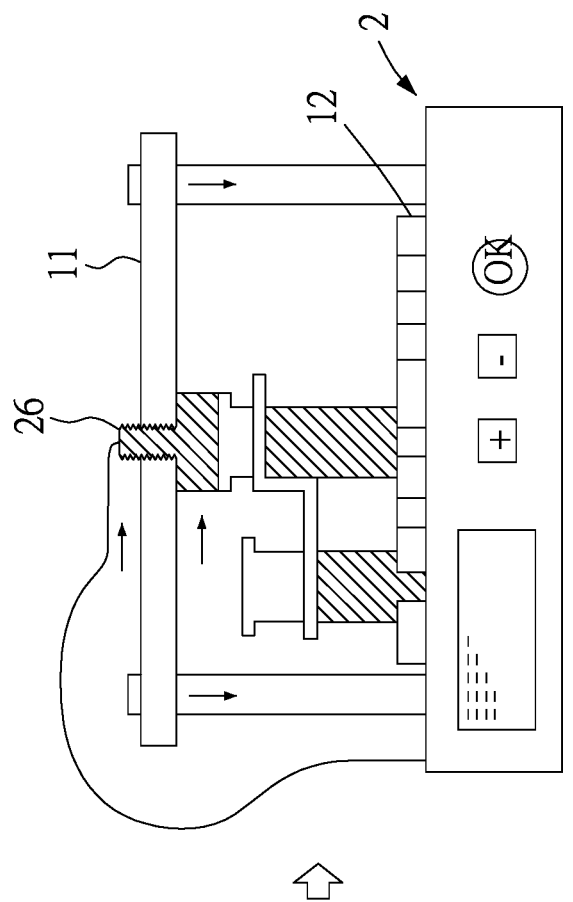
FIG. 10 is a schematic view of operation of the seventh embodiment of the present disclosure.
Figure 10:
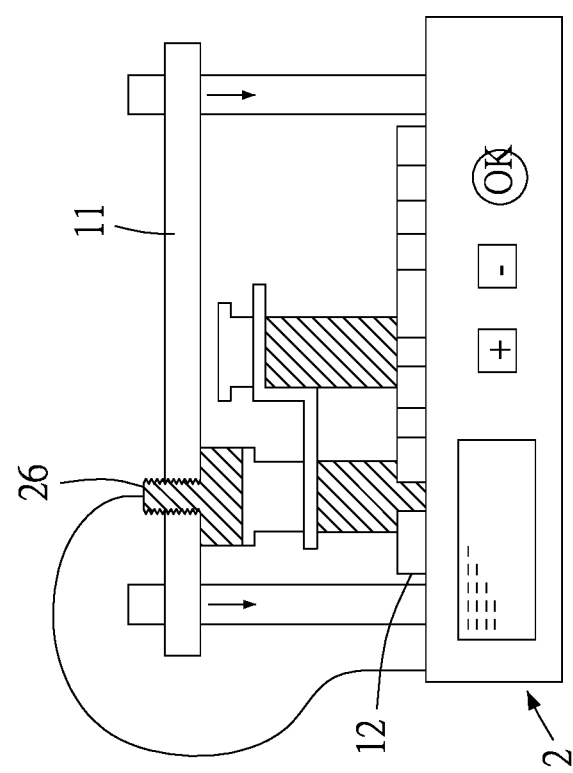
Figure 11:
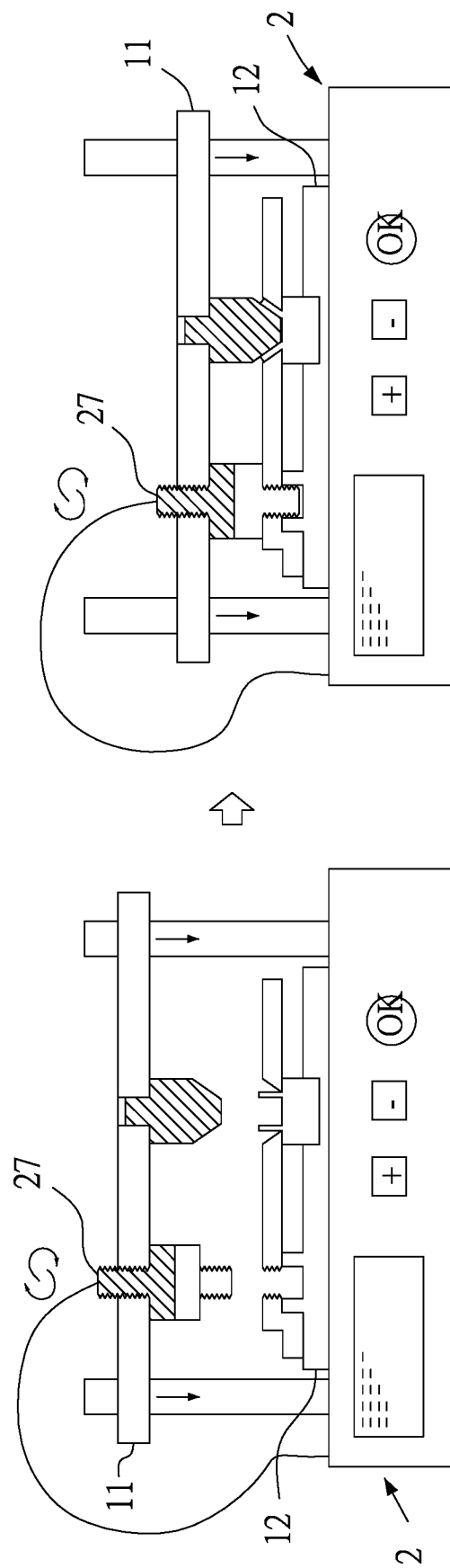
FIG. 11 is a schematic view of operation of the eighth embodiment of the present disclosure.

Referring to FIG. 10 and FIG. 11, in a preferred embodiment of the present disclosure, the first assembly die 11 and the second assembly die 12 are automated compressing devices 26 (shown in FIG. 10) or automated screwing devices 27 (shown in FIG. 11) to carry out assembly in conjunction with the assembly apparatus 2.

Figure 12:
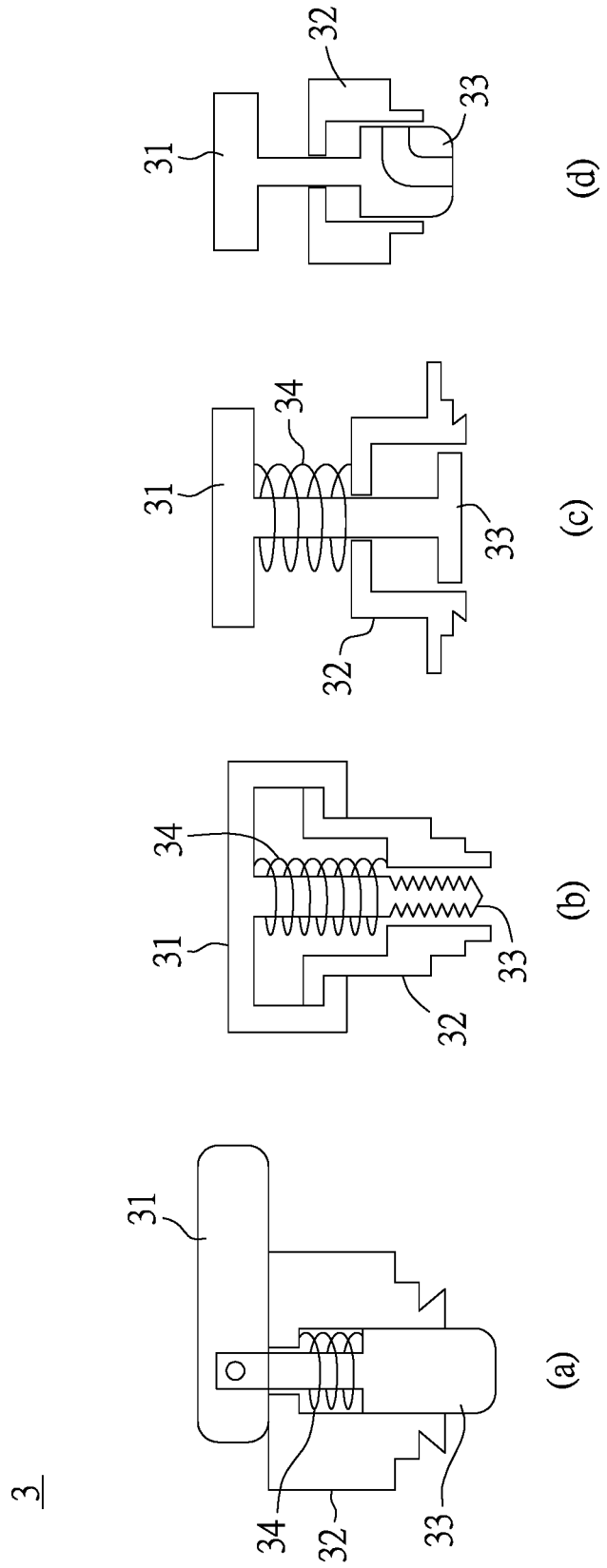
FIG. 12 is schematic view 1 of various forms of components of the present disclosure.
Figure 13:
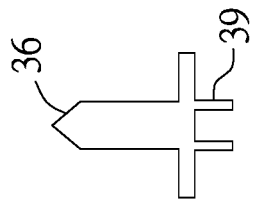
FIG. 13 is schematic view 2 of various forms of components of the present disclosure.
Figure 13:
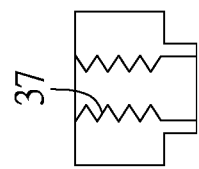
Figure 13:
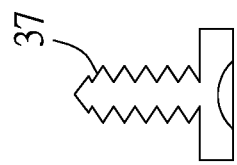
Figure 13:
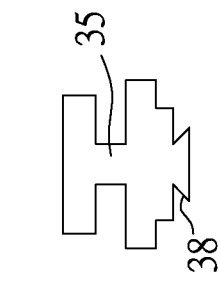
Figure 13:
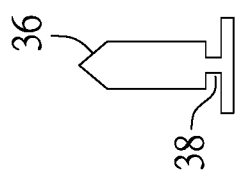
Figure 14:
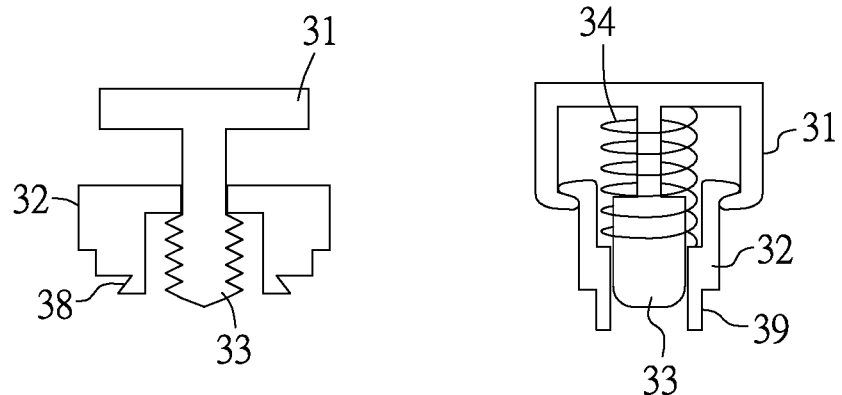
FIG. 14 is schematic view 3 of various forms of components of the present disclosure.

Referring to FIG. 12 through FIG. 14, in a preferred embodiment of the present disclosure, the engagement dies 13 can fit at least one component 3 in place. The component 3 is a clasp. The component 3 has a head 31 and body 32 which are capable of movable connection. The head 31 has a clasp 33. The clasp 33 is a column (shown in FIG. 12(a)), thread (shown in FIG. 12(b)), outward clasp (shown in FIG. 12(c)) or inward clasp (shown in FIG. 12(d)). The component 3 further comprises a resilient component 34. The resilient component 34 has one end abutting against the head 31 and the other end abutting against the body 32. Therefore, the present disclosure meets the need for practical use.

In a preferred embodiment of the present disclosure, the component 3 has a neck portion 35, a cone portion 36 or threads 37. The neck portion 35 is engaged with another object. The component 3 also has a filler space 38, expanded connection portion 39, threads or compressed portions. In a variant embodiment, the component 3 is a unitary unit or comprises constituent elements fitted together. Therefore, the present disclosure meets the need for practical use.

Figure 15:
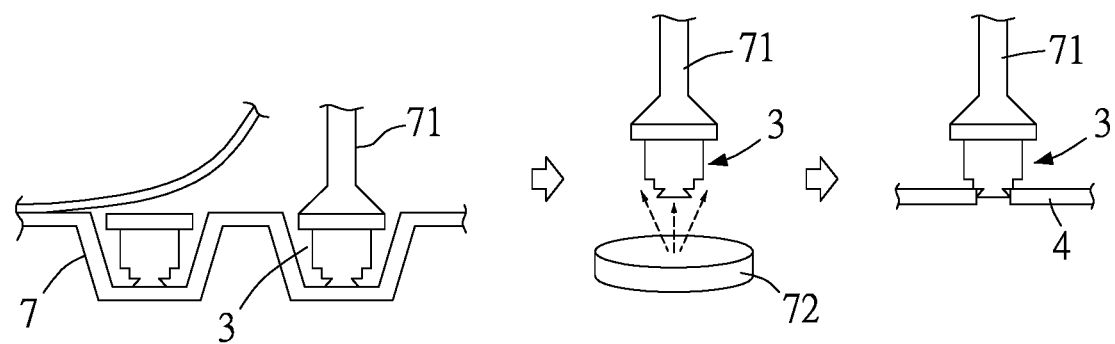
FIG. 15 is a schematic view of operation of the ninth embodiment of the present disclosure.

Referring to FIG. 15, in a preferred embodiment of the present disclosure, the component 3 is mounted on a carrier 7 and fetched with a tool 71 before being compared by a comparison device 72 to determine its position or distance relative to at least one assembly target 4. After that, the component 3 is placed at an assembled portion 41 of the assembly target 4. The tool 71 is a vacuum sucker, clamp, clasp or magnetic sucker. Therefore, the present disclosure meets the need for practical use.

Figure 16:
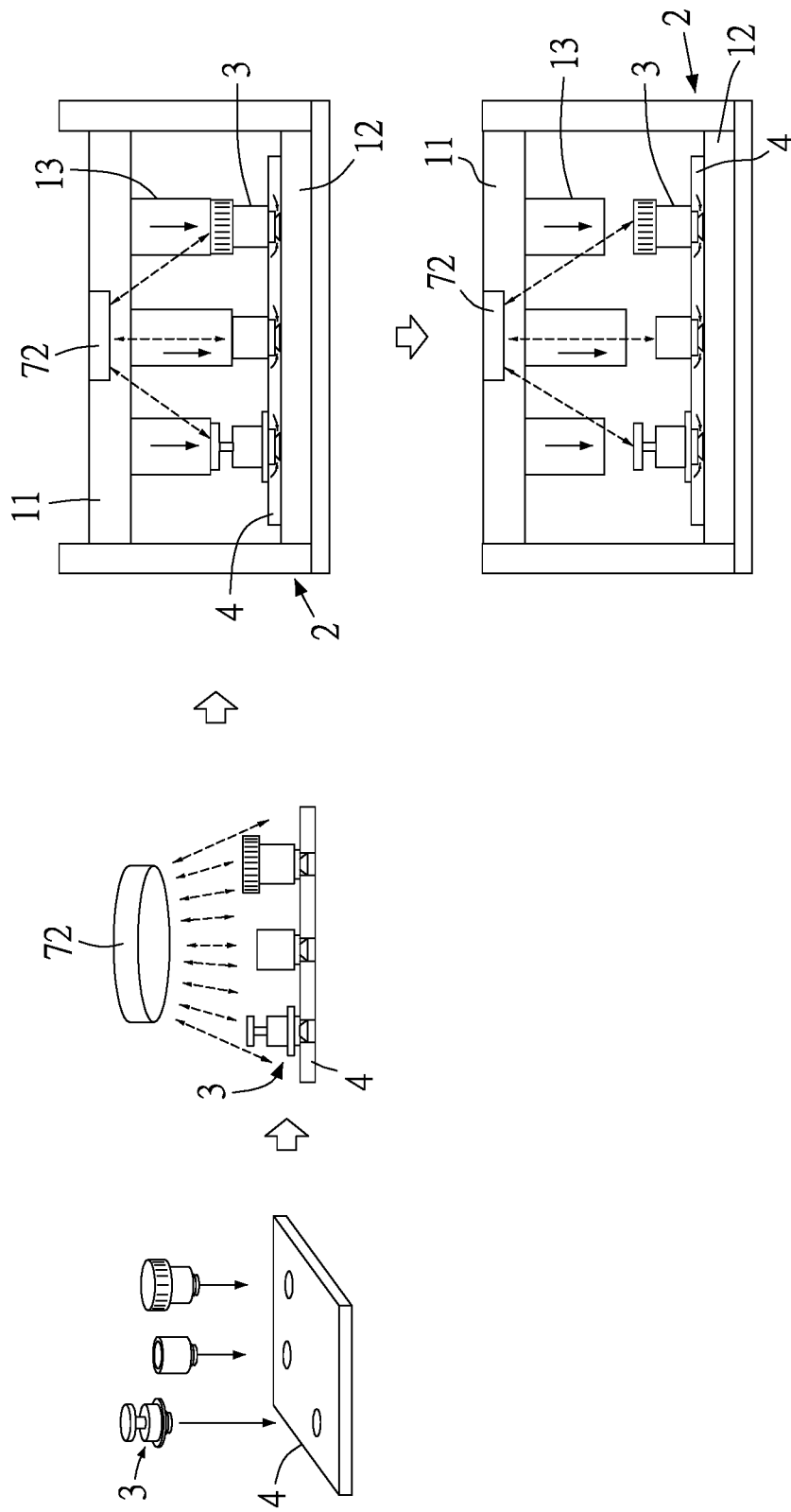
FIG. 16 is a schematic view of operation of the tenth embodiment of the present disclosure.

Referring to FIG. 16, in a preferred embodiment of the present disclosure, after the component 3 has been fetched with the tool 71, the comparison device 72 carries out comparison to determine its position or distance relative to at least one assembly target 4 and places the assembly target 4 at an assembled portion 41 of the assembly target 4. The assembly apparatus 2 has a comparison device 72 for carrying out comparison to determine its position or distance relative to the first assembly die 11 or the second assembly die 12 so as to accurately place the component 3 or the assembly target 4 at a target position of the second assembly die 12 or the first assembly die 11 or confirm that the component 3 or the assembly target 4 has been correctly positioned, so as to achieve precise assembly.

Figure 17:
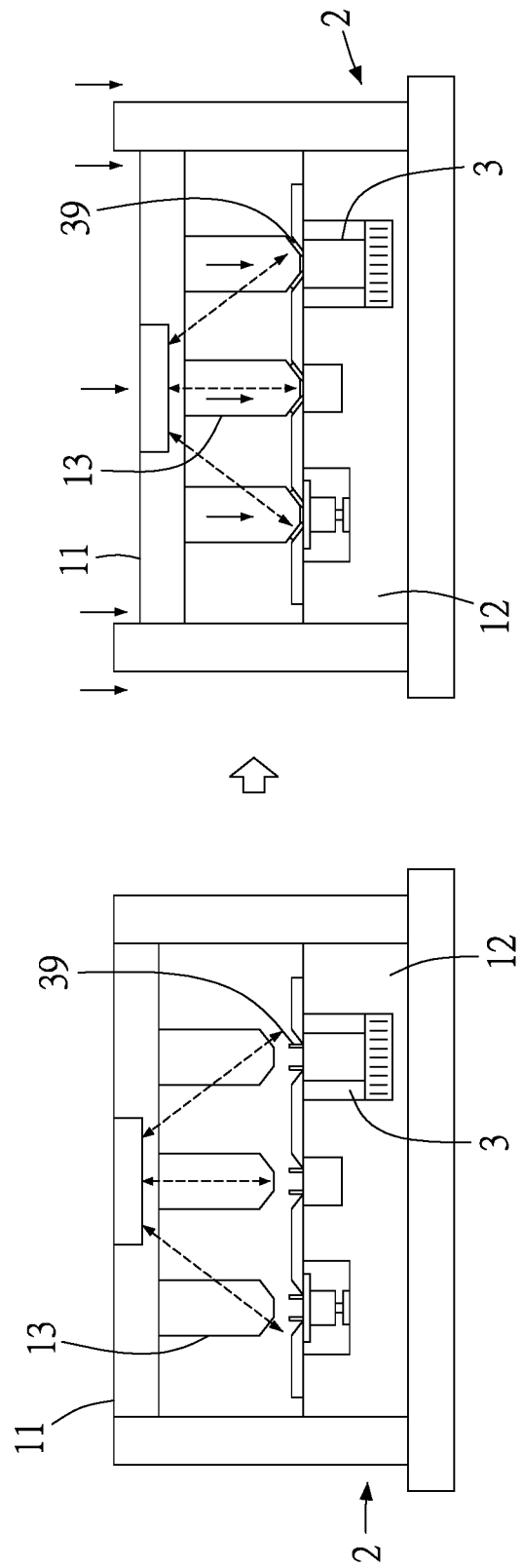
FIG. 17 is a schematic view of operation of the eleventh embodiment of the present disclosure.

Referring to FIG. 17, in a preferred embodiment of the present disclosure, the first fitting portions 111 and the second fitting portions 121 operate in conjunction with the engagement dies 13 to fit at least one assembly target 4 in place, respectively. The assembly target 4 has an assembled portion 41 for engagement with at least one component 3. The component 3 has an expanded connection portion 39.

The engagement dies 13 press against the component 3, such that the material of the component 3 is expandedly connected to the assembly target 4.

In a preferred embodiment of the present disclosure, the first assembly die 11 and the second assembly die 12 are integrally formed with the first fitting portions 111 and the second fitting portions 121, or the first assembly die 11 and the second assembly die 12 are integrally formed with the engagement dies 13, or the first assembly die 11 and the second assembly die 12 are integrally formed with the first fitting portions 111, the second fitting portions 121 and the engagement dies 13. Therefore, the present disclosure meets the need for practical use.

While the present disclosure has been described by means of specific embodiments, numerous modifications and variations could be made thereto by those skilled in the art without departing from the scope and spirit of the present disclosure set forth in the claims.

What is claimed is:

1. An assembly module, comprising:
   a first assembly die having a plurality of first fitting portions arranged in matrix;
   a second assembly die having a plurality of second fitting portions arranged in matrix and corresponding in position to the first assembly die; and
   a plurality of engagement dies removably disposed at at least one said first fitting portion and at at least one said second fitting portion,
   wherein each said engagement die of the at least one said second fitting portion has an assembly target, the assembly target having an assembled portion for fitting to a component, the component having a filler space,
   wherein each said engagement die of the at least one first fitting portion presses against the component, and material of the assembled portion enters or flows into the filler space.

2. An assembly module, comprising:
   a second assembly die having a plurality of second fitting portions arranged in matrix; and
   at least one engagement die removably disposed at at least one said second fitting portion,
   wherein each said engagement die of the at least one said second fitting portion has an assembly target, the assembly target having an assembled portion for fitting to a component, the component having a filler space and being compressed,
   wherein material of the assembled portion enters or flows into the filler space.

* * * * *

UNITED STATES PATENT AND TRADEMARK OFFICE
CERTIFICATE OF CORRECTION

| | | |
|---|---|---|
| PATENT NO. | : 11,865,604 B2 | Page 1 of 1 |
| APPLICATION NO. | : 17/951126 | |
| DATED | : January 9, 2024 | |
| INVENTOR(S) | : Ting-Jui Wang | |

It is certified that error appears in the above-identified patent and that said Letters Patent is hereby corrected as shown below:

On the Title Page

Item (30) in Column 1, insert Foreign Application Priority Data:
--TW 108146528 filed on December 18, 2019
TW 109105011 filed on February 17, 2020--

Signed and Sealed this
Twenty-fifth Day of June, 2024

*Katherine Kelly Vidal*

Katherine Kelly Vidal
*Director of the United States Patent and Trademark Office*